United States Patent [19]

Mori et al.

[11] Patent Number: 5,162,477

[45] Date of Patent: Nov. 10, 1992

[54] PREPARATION OF POLYORGANOSILANES

[75] Inventors: Shigeru Mori; Eiichi Tabei, both of Kawasaki; Akira Hayashida, Higashimurayama; Yoshinori Hida; Motoo Fukushima, both of Kawasaki, all of Japan

[73] Assignee: Shin-Etsu Chemical Co., Ltd., Tokyo, Japan

[21] Appl. No.: 812,284

[22] Filed: Dec. 23, 1991

[30] Foreign Application Priority Data

Dec. 25, 1990 [JP] Japan .................................. 2-413797

[51] Int. Cl.$^5$ ............................................. C08G 77/06
[52] U.S. Cl. ......................................... 528/14; 528/10; 556/430
[58] Field of Search ..................... 528/10, 14; 556/430

[56] References Cited

U.S. PATENT DOCUMENTS

| | | | |
|---|---|---|---|
| 4,260,780 | 4/1981 | West | 556/430 |
| 4,783,516 | 11/1988 | Schilling, Jr. et al. | 528/14 |
| 4,843,137 | 6/1989 | Taylor et al. | 528/10 |

*Primary Examiner*—Melvyn I. Marquis
*Assistant Examiner*—M. W. Glass
*Attorney, Agent, or Firm*—Birch, Stewart, Kolasch & Birch

[57] ABSTRACT

Polyorganosilanes are prepared by contact reaction of organodihalosilanes with alkali metal fine particles in an organic solvent. Prior to the contact reaction, a triorganohalosilane is contacted with the dispersion of alkali metal fine particles in organic solvent for removing reactive oxygen and moisture from the dispersion. Formation of a siloxane bond in the polysilane backbone is minimized, and polyorganosilanes having a minimal oxygen content are obtained.

5 Claims, No Drawings

PREPARATION OF POLYORGANOSILANES

CROSS-REFERENCE TO THE RELATED APPLICATION

This application is related to Shigeru MORI, Eiichi TABEI, Motoo FUKUSHIMA and Yoshinori HIDA, patent application entitled "Preparation of Polyorganosilanes", Ser. No. 07/812,279, concurrently filed herewith, corresponding to Japanese Patent Application No. 413796/1990.

This invention relates to a method for preparing polyorganosilanes.

BACKGROUND OF THE INVENTION

For the synthesis of polysilanes, the Wurtz coupling method of condensing dihalosilanes with the aid of alkali metals has been most widely used partially because the starting reactants are readily available compared with other methods. Since the Wurtz coupling reaction proceeds through a complex polymerization mechanism, strict control of reaction conditions is necessary to obtain high molecular weight polysilanes in a well reproducible manner.

For example, if moisture is inadvertently introduced into a reaction system of synthesizing polyorganosilanes from organodihalosilanes and alkali metals in accordance with this method, siloxane bonds can form in polysilane skeletons, resulting in cleavage of the $\sigma$-conjugation characteristic of polysilanes or disturbing the structural control.

For the purpose of reducing the moisture content as low as possible, a reaction system for the synthesis of organopolysilanes must be carefully set up. A reactor must be fully dried and the air in the reactor must be purged with dry inert gas. An organic solvent must be dried over metallic sodium and distilled before alkali metal particles are dispersed therein. The particles of alkali metal, for example, metallic sodium must be prepared by cutting a metal mass into appropriate size in a dry atmosphere. Although such individual procedures are done with special care for moisture, there is still left the possibility of moisture entry into the reaction system between the procedures, for example, during admission metallic sodium fragments into the reactor because of probable contact with the ambient atmosphere. Then siloxane bonds can be eventually formed in polysilane skeletons.

SUMMARY OF THE INVENTION

Therefore, an object of the present invention is to provide a method for preparing a polyorganosilane while minimizing formation or introduction of a siloxane bond into the polysilane skeleton.

In the preparation of a polyorganosilane by subjecting an organodihalosilane to contact reaction with alkali metal fine particles dispersed in an organic solvent, the inventors have found that by contacting a triorganohalosilane with the dispersion of alkali metal fine particles in an organic solvent prior to the contact reaction of organodihalosilane with alkali metal fine particles, reactive oxygen and moisture can be removed from the reaction system, whereby introduction of oxygen into the polysilane skeleton, that is, formation of a siloxane bond is minimized.

The invention is based on the fact that a triorganohalosilane, for example, a trimethylhalosilane reacts with alkali metal very slowly. When a trimethylhalosilane is contacted with alkali metal particles at elevated temperatures, the trimethylhalosilane reacts with sodium oxide formed on the surface of metallic sodium particles, for example, in the manner that trimethylhalosilane converts into hexamethyldisiloxane and the sodium oxide is consumed, which means that reactive oxygen is removed. At the same time, trimethylhalosilane reacts with water in the system to convert into hexamethyldisiloxane and trimethylsilanol, which means that the system is dewatered. Even when some moisture is inadvertently introduced into the system, the above-mentioned procedure can remove reactive oxygen and water from the system prior to the reaction of organodihalosilane. Thereafter, organodihalosilane is subjected to contact reaction with alkali metal particles in the controlled system. The reduced level of oxygen in the system ensures that a polyorganosilane having a reduced oxygen content is produced, that is, oligomers having a high siloxane content are formed in a least amount. At the same time, the minimized formation of siloxane permits that polysilane to extend its chain length, that is, the resulting polyorganosilane is increased in average molecular weight.

Therefore, the present invention provides a method for preparing a polyorganosilane comprising the steps of:

contacting a triorganohalosilane, preferably a trimethylhalosilane, with a dispersion of alkali metal fine particles in an organic solvent for removing reactive oxygen and moisture from the dispersion, and thereafter, subjecting an organodihalosilane to contact reaction with the dispersion of alkali metal fine particles in an organic solvent.

DETAILED DESCRIPTION OF THE INVENTION

The present invention is directed to a method for preparing a polyorganosilane by subjecting an organodihalosilane to contact reaction with alkali metal fine particles dispersed in an organic solvent.

The starting reactant is an organodihalosilane which may be represented by the following general formula (1).

In formula (1), $R^1$ and $R^2$ may be the same or different and are independently selected from the group consisting of a hydrogen atom and a monovalent hydrocarbon group. Preferred monovalent hydrocarbon groups are those having 1 to 12 carbon atoms, especially 1 to 6 carbon atoms, for example, substituted or unsubstituted alkyl, alkenyl, and aryl groups such as methyl, ethyl, propyl, butyl, hexyl, vinyl, allyl, phenyl, X is a halogen atom such as chlorine, bromine and iodine. Organodihalosilanes may be used alone or in admixture of two or more.

According to the present invention, the organodihalosilanes are contact reacted with alkali metal fine particles such as lithium and sodium. The alkali metal is generally available as a mass immersed in mineral spirit. It is preferred to cut an alkali metal mass into fragments of appropriate size, admit the fragments into a reactor such as a flask, and finely divide the fragments in the reactor rather than admitting fine particles of alkali metal into the reactor because no extra water can be introduced into the reaction system. The amount of alkali metal used preferably ranges from about 2.0 to about 2.5 mol, especially from about 2.0 to about 2.1 mol per mol of the organodihalosilane.

Contact reaction of the organodihalosilanes with alkali metal fine particles is carried out in an organic solvent system, preferably in an inert atmosphere such as nitrogen. Useful solvents include toluene, xylene, decane, and dodecane. The reaction temperature is preferably 100° C. or higher, preferably 100° to 150° C. If desired, copper halides such as CuCl, $CuCl_2$, CuBr, $CuBr_2$, CuI, and $CuI_2$ may be used as a catalyst in an amount of about $1 \times 10^{-4}$ to about 5% by weight of the amount of the diorganodihalosilane. The reaction time may be in a range of about 4 to about 8 hours.

Contact region of an organodihalosilane with alkali metal fine particles dispersed in an organic solvent results in a reaction solution containing an alkali metal halide and the excess alkali metal along with an end polyorganosilane. An alcohol including an aliphatic monohydric alcohol having 1 to 4 carbon atoms such as methanol, ethanol, isopropyl alcohol, and a silanol such as trimethylsilanol is added to the reaction solution for deactivating the excess alkali metal while the alkali metal halide can be removed by adding water to the reaction solution for dissolving away the salt. Upon addition of water to the reaction solution, the reaction solution separates into two layer, aqueous and organic layers. The organic layer in which the polyorganosilane is dissolved is then worked up in a conventional manner. There is produced a polyorganosilane having the following general formula (2):

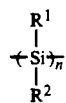
(2)

wherein $R^1$ and $R^2$ are as defined above and n is an integer of at least 2, preferably from 2 to 10,000.

One preferred post-treatment of the reaction solution is to adjust the reaction solution to pH 3 to 7 before or after deactivation of the alkali metal by an acid. Then the salt can be effectively washed away with water while minimizing formation of insoluble components. This is the subject matter of our cross-referenced patent application.

The feature of the present invention is to contact a triorganohalosilane with a dispersion of alkali metal fine particles in an organic solvent for removing reactive oxygen and moisture from the dispersion, prior to the above-mentioned contact reaction of an organodihalosilane with alkali metal fine particles in organic solvent. Trimethylhalosilanes such as trimethylchlorosilane are preferred triorganohalosilanes.

The amount of triorganohalosilane used varies depending on the contents of water and reactive oxygen in the reaction system. For efficient operation, it is used in an amount of about 0.1 to about 5.0 parts, more preferably from about 1.0 to about 5.0 parts by weight per 100 parts by weight of the organic solvent used to disperse alkali metal particles. The system having triorganohalosilane added thereto is preferably heated at a temperature of about 60° to about 70° C. for about ½ to about 1 hour. The triorganohalosilane admitted into the system forms hexamethyldisiloxane, trimethylsilanol and other products while consuming reactive oxygen and water in the system. These products can be separated and removed from the system by heating the system for distillation.

EXAMPLE

Examples of the present invention are given below by way of illustration and not by way of limitation.

Example

After drying over metallic sodium, 60 grams of xylene was weighed in the ambient atmosphere and admitted into a four-necked flask, which was purged with dry nitrogen. A columnar metallic sodium mass which had been immersed in mineral spirit was cut into fragments of appropriate size and 4.8 grams of sodium fragments was weighed both in the ambient atmosphere, and the fragments were admitted into the flask in a nitrogen gas flow. The metallic sodium was finely divided by heating and agitating the mixture under reflux until a constant particle size was reached, obtaining a sodium dispersion.

The dispersion was rapidly cooled and 1.0 grams of trimethylchlorosilane was admitted into the flask. The flask was heated to 60° to 70° C. and stirred at the temperature for one hour. Trimethylchlorosilane and hexamethyldisiloxane were withdrawn through an ester adaptor until the reflux temperature was stabilized at 136° C.

Then 19.1 grams of methylphenyldichlorosilane was added dropwise and contact reaction was continued for 6 hours at 136° C. The reaction solution was cooled down to room temperature, terminating the reaction. Methanol (3 ml) was added to the reaction solution to deactivate the excess metallic sodium. Water (100 grams) was added to the reaction solution for dissolving and separating the sodium chloride resulting from the contact reaction. The organic layer was taken out and worked up, obtaining a polyorganosilane of formula (3) in a yield of 78%.

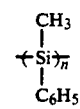
(3)

Comparative Example

The procedure of Example was repeated except that the addition of trimethylchlorosilane was omitted after the sodium dispersion was obtained. A polyorganosilane was obtained in a yield of 60%.

The isolated polyorganosilanes of Example and Comparative Example were measured for oxygen content and average molecular weight, with the results shown in Table 1.

TABLE 1

| | Example | Comparative Example |
|---|---|---|
| Oxygen content | 0.2 wt % | 2.0 wt % |
| Average molecular weight | 80,000 | 60,000 |

Evidently, the addition of trimethylchlorosilane to the sodium dispersion ensures subsequent production of a polyorganosilane having a minimal oxygen content and a high average molecular weight.

There has been described a simple method capable of removing water and reactive oxygen from an alkali metal-solvent dispersion for use as a reaction system for producing polyorganosilane. Oligomers having a high siloxane content are formed only in a minimized amount while a polyorganosilane having a low oxygen content is obtained. At the same time, since the formation of siloxane is suppressed, the polyorganosilane can extend its chain length, resulting in an increased average molecular weight. Since the risk that the structure of polyorganosilane be disordered by siloxane is avoided, the dependency of photoelectric property on temperature is reduced.

Although some preferred embodiments have been described, many modifications and variations may be made thereto in the light of the above teachings. It is therefore to be understood that within the scope of the appended claims, the inventory may be practiced otherwise than as specifically described.

We claim:

1. A method for preparing a polyorganosilane comprising the steps of:
   contacting a triorganohalosilane with a dispersion of alkali metal fine particles in an organic solvent for removing reactive oxygen and moisture from the dispersion, and
   thereafter, subjecting an organodihalosilane to contact reaction with the dispersion of alkali metal fine particles in an organic solvent.

2. The method of claim 1 wherein said triorganohalosilane is a trimethylhalosilane.

3. The method of claim 1, wherein said triorganohalosilane is added to the dispersion in an amount of about 0.1 to about 5.0 parts by weight per 100 parts by weight of said organic solvent.

4. The method of claim 3, wherein said triorganohalosilane is added to the dispersion in an amount of about 1.0 to about 5.0 parts by weight per 100 parts by weight of said organic solvent.

5. A method for preparing a polyorganosilane comprising the steps of:
   (a) adding a trimethylchlorosilane to a dispersion of alkali metal fine particles in an organic solvent in an amount of about 0.1 to about 5.0 parts by weight per 100 parts by weight of said organic solvent;
   (b) removing reactive oxygen and water from said dispersion by reacting said trimethylchlorosilane with said oxygen and water at a temperature of about 60° to 70° C.;
   (c) removing the reaction product produced in step (b) from said dispersion by distillation; and
   (d) subjecting an organodihalosilane to contact reaction with said dispersion of alkali metal fine particles in an organic solvent produced in step (c) to thereby produce a polyorganosilane.

* * * * *